United States Patent
Moon

(10) Patent No.: US 9,147,869 B2
(45) Date of Patent: Sep. 29, 2015

(54) RECHARGEABLE BATTERY

(75) Inventor: Jong-Seok Moon, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 513 days.

(21) Appl. No.: 13/064,964

(22) Filed: Apr. 28, 2011

(65) Prior Publication Data

US 2012/0088147 A1    Apr. 12, 2012

(30) Foreign Application Priority Data

Oct. 12, 2010 (KR) .................. 10-2010-0099502

(51) Int. Cl.
*H01M 2/04*    (2006.01)
*H01M 2/30*    (2006.01)
*H01M 2/02*    (2006.01)

(52) U.S. Cl.
CPC .............. *H01M 2/30* (2013.01); *H01M 2/0217* (2013.01); *H01M 2/0277* (2013.01)

(58) Field of Classification Search
CPC ........................................................ H01M 2/04
USPC ........................................................ 429/179
See application file for complete search history.

(56) References Cited

U.S. PATENT DOCUMENTS

| | | | |
|---|---|---|---|
| 7,563,535 B2 | 7/2009 | Hiratsuka | |
| 2005/0058889 A1* | 3/2005 | Goishihara | 429/94 |
| 2006/0127756 A1* | 6/2006 | Seo | 429/175 |
| 2006/0234119 A1* | 10/2006 | Kruger et al. | 429/160 |
| 2007/0269685 A1* | 11/2007 | Chu et al. | 429/3 |
| 2008/0003498 A1 | 1/2008 | Yasuda et al. | |
| 2010/0209750 A1* | 8/2010 | Nagamatsu et al. | 429/94 |
| 2011/0086265 A1 | 4/2011 | Suzuki | |

FOREIGN PATENT DOCUMENTS

| | | |
|---|---|---|
| EP | 1445806 A1 | 8/2004 |
| JP | 09-199178 | 7/1997 |
| JP | 2003-303580 | 10/2003 |
| JP | 2006-278245 | 10/2006 |
| JP | 2009-301892 | 12/2009 |
| JP | 64-23875 * | 9/2014 |
| KR | 20-0174366 | 12/1999 |

(Continued)

OTHER PUBLICATIONS

European Office Action dated Mar. 12, 2012.

(Continued)

*Primary Examiner* — Ula Ruddock
*Assistant Examiner* — Jacob Marks
(74) *Attorney, Agent, or Firm* — Lee & Morse, P.C.

(57) ABSTRACT

A rechargeable battery includes an electrode assembly that undergoes charging and discharging; a case containing the electrode assembly; a terminal electrically connected to the electrode assembly and protruding from an interior of the case to an exterior of the case; a lead tab electrically connecting the terminal and the electrode assembly; and an insulating pack that insulates the electrode assembly from the case, the electrode assembly being disposed in the insulating pack and the insulating pack being disposed in the case, the insulating pack including one or more indentation portions formed at one edge and one or more grooves positioned to correspond to the indentation portion and insertion-coupled to the indentation portion.

8 Claims, 9 Drawing Sheets

(56) References Cited

FOREIGN PATENT DOCUMENTS

| KR | 10-2000-0039287 A | 7/2000 |
|---|---|---|
| WO | WO-2008/050211 A1 | 5/2008 |
| WO | WO-2009/131894 A1 | 10/2009 |

OTHER PUBLICATIONS

Korean Office Action dated Dec. 30, 2011.

* cited by examiner

RECHARGEABLE BATTERY

BACKGROUND

1. Field

The described technology relates generally to a rechargeable battery. More particularly, the described technology relates generally to a rechargeable battery including an electrode assembly and a case insulated from each other.

2. Description of the Related Art

A rechargeable battery can be repeatedly charged and discharged, unlike a primary battery that cannot be recharged. A low-capacity rechargeable battery is used for small portable electronic devices, such as mobile phones, laptop computers, and camcorders. A large-capacity battery is used as a power source for driving motors, such as for hybrid vehicles.

In recent years, a high-power rechargeable battery using a non-aqueous electrolyte having a high energy density has been under development. The high-power rechargeable battery includes a battery module in which a plurality of rechargeable batteries are coupled in series so that the high-power rechargeable battery can be used to drive the motors of devices requiring high power, such as electric vehicles.

Also, a single large-capacity high-output rechargeable battery generally includes a plurality of rechargeable batteries connected in series, and such rechargeable batteries may have a cylindrical shape, an angular (i.e., rectangular or quadrangular) shape, a pouch-like shape, or the like.

The above information disclosed in this Background section is only for enhancement of understanding of the background of the described technology and therefore it may contain information that does not form the prior art that is already known in this country to a person of ordinary skill in the art.

SUMMARY

According to an exemplary embodiment, there is provided a rechargeable battery including an electrode assembly that undergoes charging and discharging, a case containing the electrode assembly, a terminal electrically connected to the electrode assembly and protruding from an interior of the case to an exterior of the case, a lead tab electrically connecting the terminal and the electrode assembly, and an insulating pack that insulates the electrode assembly from the case, the electrode assembly being disposed in the insulating pack and the insulating pack being disposed in the case, the insulating pack including one or more indentation portions formed at one edge and one or more grooves positioned to correspond to the indentation portion and insertion-coupled to the indentation portion.

The insulating pack may include a receiving portion having an opening at one side, configured to receive the electrode assembly and a covering portion covering the opening.

The covering portion may include a first cover that extends from one edge of the opening in the direction of the terminal and that includes a plurality of the indentation portions disposed in a length direction of the case, and a second cover that extends from another edge of the opening at a position facing the first cover, and including a plurality of the grooves disposed at a position facing the indentation portions and insertion-coupled to the indentation portion.

The receiving portion may have a polygonal shape and wherein the opening is in a direction of the terminal.

The receiving portion may have an opened side surface where the lead tab is located.

The insulating pack may have a pouch shape.

The covering portion may include a first cover that extends at one edge of the opening thereby covering a portion of the opening and having a plurality of the grooves formed in a length direction of the case, and a second cover that extends at another edge of the opening thereby overlapping a portion of the first cover, and having a plurality of indentation portions at a position facing the grooves and insertion-coupled to the grooves.

The insulating pack may include a through-hole through which the lead tab extends.

The insulating pack may include a hard polyvinyl chloride material having a plasticizer content of less than 10%.

The one or more indentation portions and the one or more grooves may be monolithically formed with the same material as the insulating pack.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
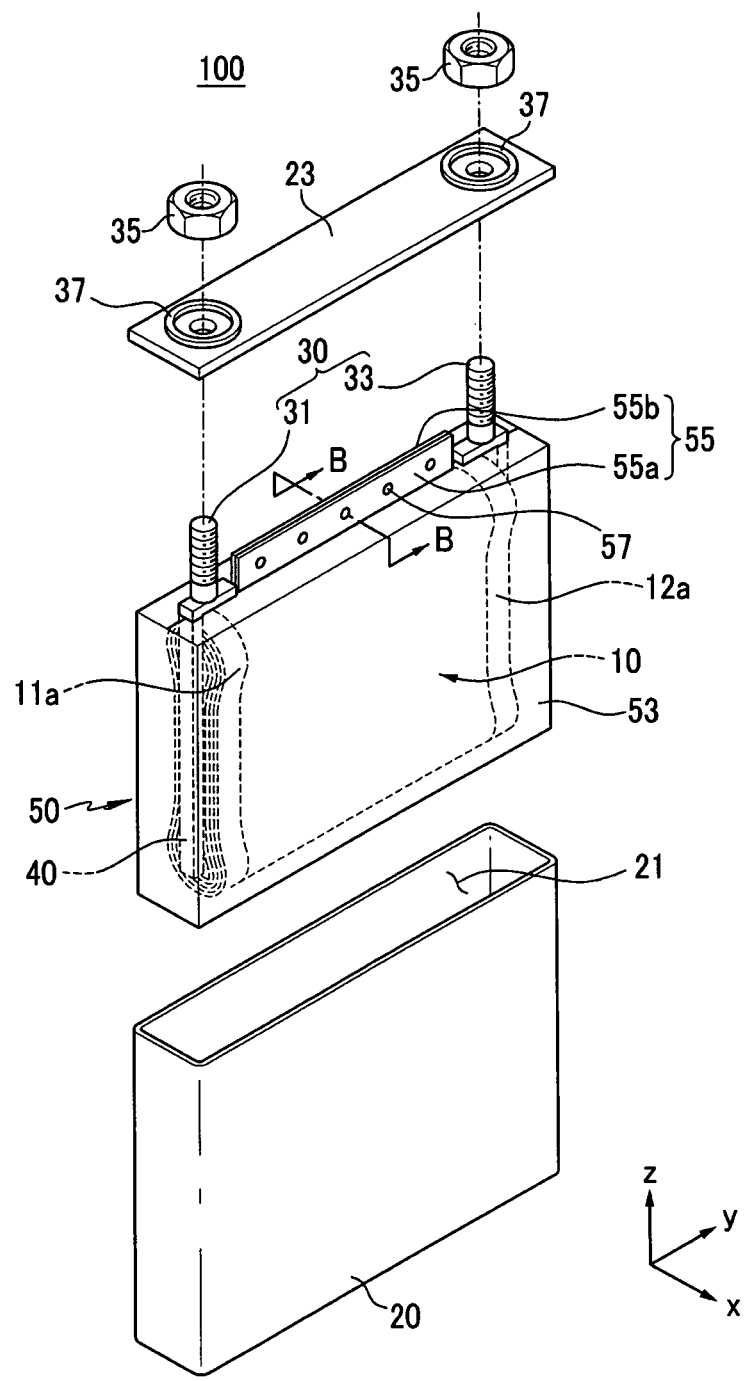
FIG. 1 illustrates an exploded perspective view of a rechargeable battery according to an exemplary embodiment.

Korean Patent Application No. 10-2010-0099502, filed on Oct. 12, 2010, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

A rechargeable battery according to exemplary embodiments will now be described in detail with reference to the accompanying drawings. However, the embodiments are not limited to the exemplary embodiments disclosed hereinafter, but may be implemented in various different forms. The exemplary embodiments herein merely complete the disclosure and fully provide explanation to the ordinarily skilled person in the art.

Figure 2:
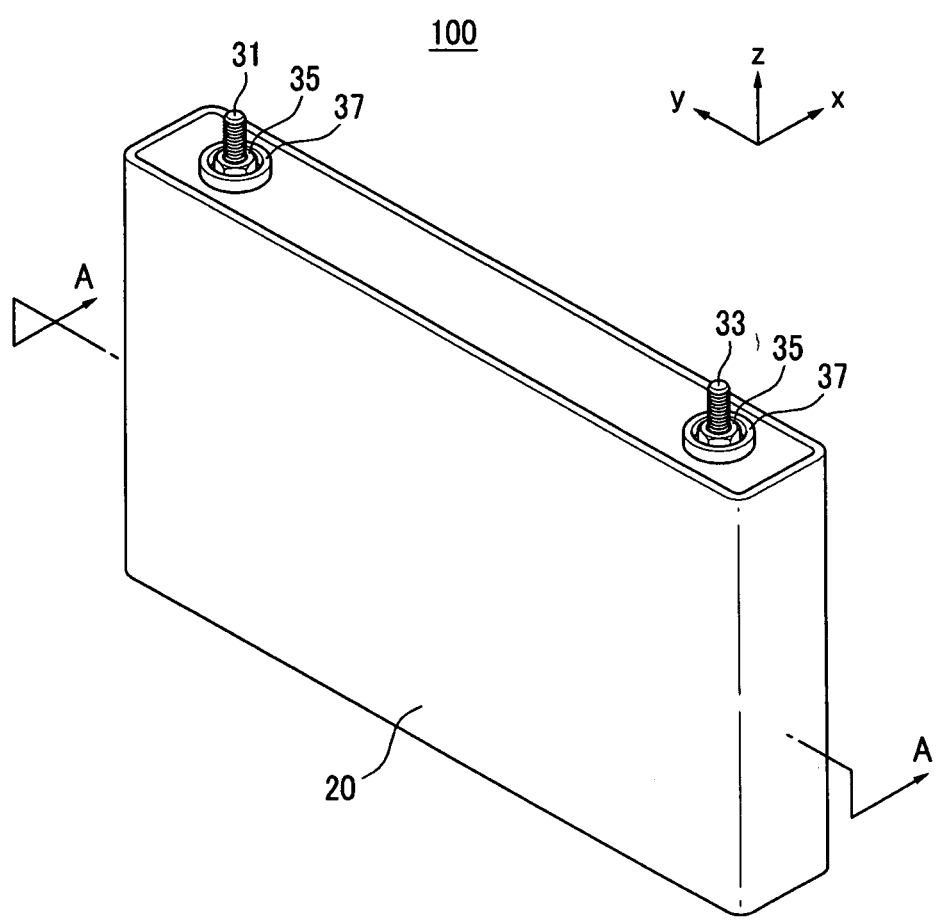
FIG. 2 illustrates a perspective view of a rechargeable battery according to an exemplary embodiment.
Figure 3:
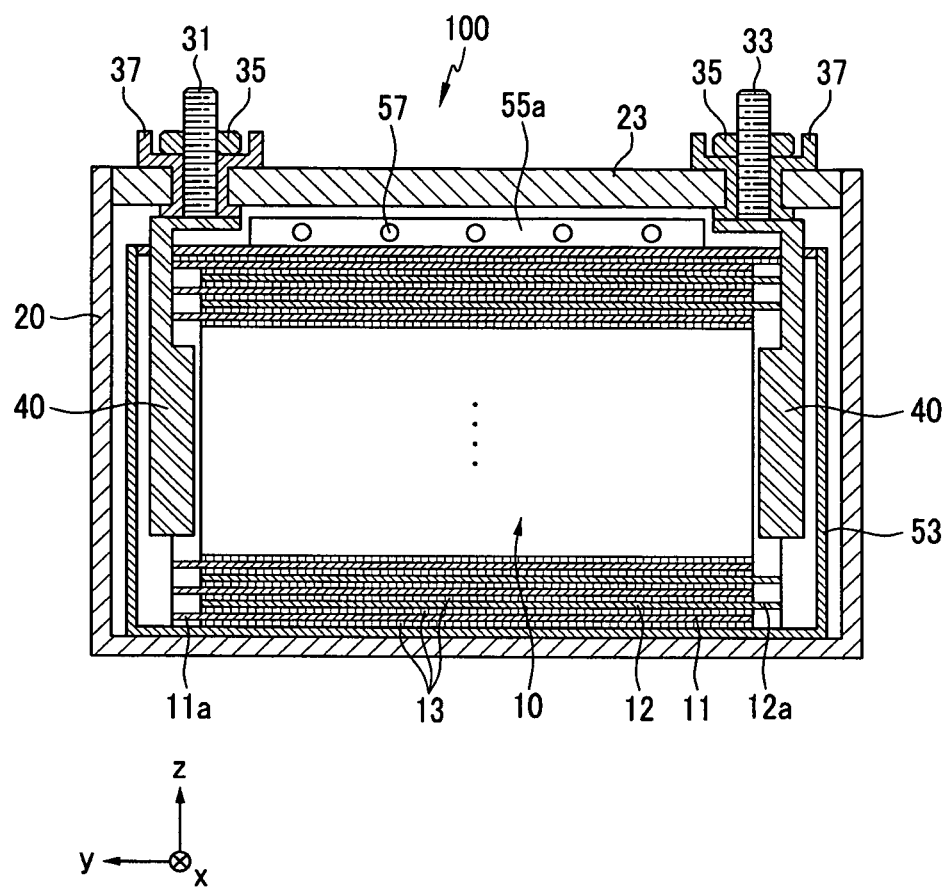
FIG. 3 illustrates a cross-sectional view taken along the line A-A of FIG. 2.

FIG. 1 illustrates an exploded perspective view of a rechargeable battery according to a first exemplary embodiment, FIG. 2 illustrates a perspective view of a rechargeable battery according to the first exemplary embodiment, and FIG. 3 illustrates a cross-sectional view taken along the line A-A of FIG. 2.

As shown in FIG. 1 to FIG. 3, a rechargeable battery 100 according to an exemplary embodiment includes an electrode assembly 10 that undergoes charging and discharging, a case 20 in which the electrode assembly 10 is installed, a terminal 30 electrically connected to the electrode assembly 10 and protruding outside the case 20, a lead tab 40 electrically connecting the terminal 30 and the electrode assembly 10, and an insulating pack 50 that insulates the electrode assembly 10 from the case 20. The insulating pack 50 is installed in the case 20, and the electrode assembly 10 is installed in the insulating pack 50. A cap plate 23 is installed to cover an opening 21 of the case 20. The terminal 30 including an anode terminal 31 and a cathode terminal 33 extends through the cap plate 23.

An anode 11 and a cathode 12 of the electrode assembly 10 include coated portions of a collector formed as a thin metal foil on which an active material is coated, and uncoated portions 11a and 12a on which the active material is not coated, respectively. The anode uncoated portion 11a may be formed on one side end along a lengthwise direction of the anode 11, and the cathode uncoated portion 12a may be formed on the other side end along a lengthwise direction of the cathode 12.

The anode 11 and the cathode 12 may be stacked with a separator 13, which is an insulating body, interposed therebetween, and the anode 11, cathode 12 and separator 13 may be wound by using a winding roll or the like so as to be formed as an electrode assembly 10 in the form of a jelly roll. The electrode assembly 10 may be pressurized by a press or the like to have a flat form such that the electrode assembly 10 may be installed in the case 20.

After the electrode assembly 10 is inserted into the case 20, a nut 35 may be coupled to the terminal 30 thereby providing upward support to the electrode assembly 30. A gasket 37 for insulation may be installed between the nut 35 and the cap plate 23.

Referring to FIG. 2 and FIG. 3, the lead tab 40 of the anode terminal 31 may be attached to the anode uncoated portion 11a formed at the side end of the electrode assembly 10 through welding, and the lead tab 40 of the cathode terminal 33 maybe attached to the cathode uncoated portion 12a through welding.

The case 20 may be made of a conductive metal such as aluminum, an aluminum alloy, and steel plated with nickel and may have an angular shape, such as, for example, a hexahedron shape, with an opening 21 formed at one surface providing a space to receive the electrode assembly 10. The electrode assembly 10 of the present exemplary embodiment is installed in the case 20 with the insulating pack 50.

Figure 4:
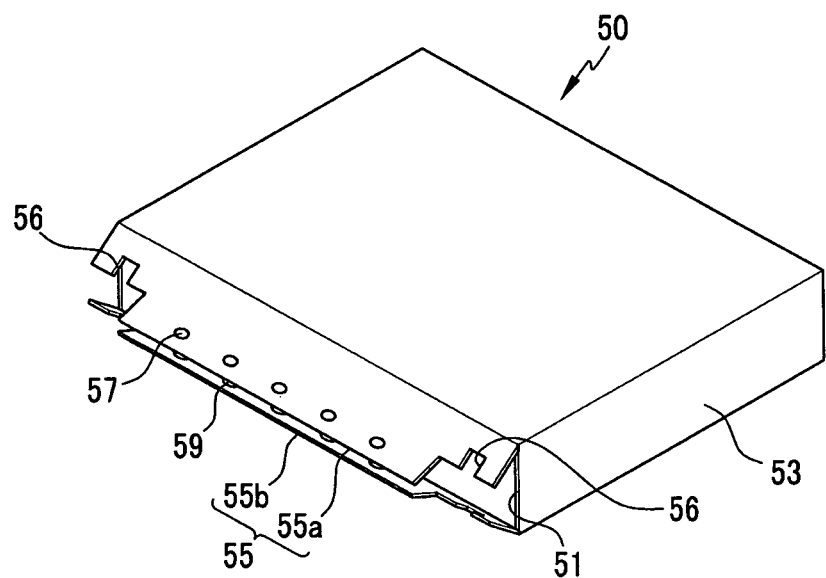
FIG. 4 illustrates a view showing an insulating pack of a state in which an electrode assembly is not inserted.

FIG. 4 illustrates a view showing an insulating pack in a state that an electrode assembly has not yet been inserted therein.

As shown in FIG. 4, the insulating pack 50 may include a receiving portion 53 having an opening 51 formed at one side into which the electrode assembly 10 is inserted, and a covering portion 55 covering the opening 51. The receiving portion 53 may be formed with an angular shape such that the opening 51 is formed in the direction of the terminal 30 in the finished rechargeable battery 100. The opening 51 may be selectively sealed by the covering portion 55. Also, a through-hole 56 through which the lead tab 40 extends may be formed at the insulating pack 50.

The insulating pack 50 in the present exemplary embodiment may be made of a hard polyvinyl chloride material that has a plasticizer content of less than 10%. If the plasticizers content of the insulating pack 50 were to be over 10%, the insulating pack 50 could have a flexible characteristic like a film such that it could be difficult to stably receive the electrode assembly 10. According to the present exemplary embodiment, the insulating pack 50 may be formed of a hard polyvinyl chloride material including the plasticizer content of less than 10%. Therefore, the electrode assembly 10 may be stably received inside the case 20.

The receiving portion 53 may be sealed by the covering portion 55 when the electrode assembly 10 is received therein. This receiving portion 53 may include a first cover 55a that extends at the opening 51 and a second cover 55b that extends at the opening 51 to face the first cover 55a. In the sealed insulating pack 50, the second cover 55b is fixed to the first cover 55a.

The first cover 55a may extend from one edge of the opening 51 of the receiving portion 53, and a plurality of indentation portions 57 may be disposed in the length direction thereof. The second cover 55b may extend from another edge of the opening 51, and a plurality of grooves 59 may be disposed at positions facing the indentation portions 57. In the present exemplary embodiment, the indentation portions 57 and the grooves 59 may be monolithically formed with the same material as the material of the insulating pack 50.

Figure 5A:
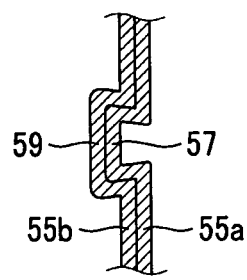
FIG. 5A illustrates a cross-sectional view showing a coupling state of an indentation portion and a groove, taken along the line B-B of FIG. 1.
Figure 5B:
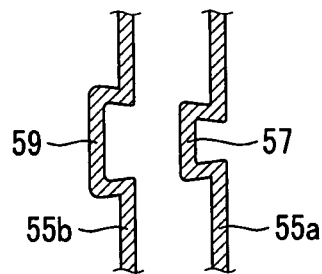
FIG. 5B illustrates a cross-sectional view showing a state before a coupling of an indentation portion and a groove of FIG. 5A.

FIG. 5A illustrates a cross-sectional view showing a coupling state of an indentation portion and a groove, taken along the line B-B of FIG. 1, and FIG. 5B illustrates a cross-sectional view showing a state before coupling of an indentation portion and a groove of FIG. 5A.

As shown in FIG. 5A and FIG. 5B, the indentation portion 57 may be insertion-coupled to the groove 59. The indentation portion 57 may protrude from a surface of the first cover 55a with an inverse trapezoid shape and the groove 59 may be formed in the surface of the second cover 55b with an inverse trapezoid shape corresponding to the shape of the indentation portion 57. The indentation portion 57 and the groove 59 may be easily insertion-coupled.

As described above, the insulating pack 50 of the present exemplary embodiment may be received in the case 20 in the state in which the electrode assembly 10 has been inserted therein. Impact transmission to the electrode assembly 10 corresponding to an external impact may be minimized. The opening 51 of the insulating pack 50 may be sealed by using the indentation portions 57 and the grooves 59, which may provide a button type coupling. Damage to the insulating pack 50 in the event of an external impact to the rechargeable battery 100 may be prevented. Thereby, the electrode assembly 10 may be stably contained in the case 20.

Figure 6:
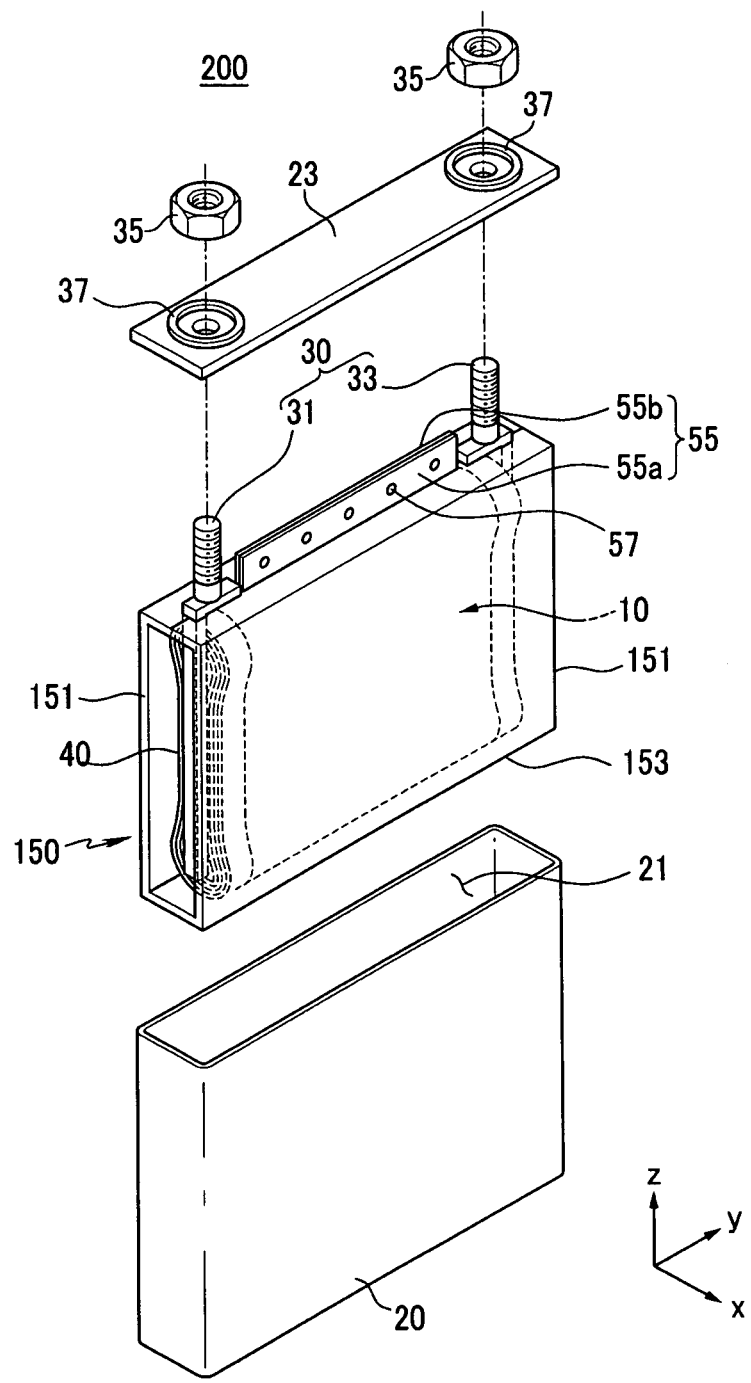
FIG. 6 illustrates an exploded perspective view of a rechargeable battery according to another exemplary embodiment.

FIG. 6 illustrates an exploded perspective view of a rechargeable battery according to another exemplary embodiment. The same reference numerals as those of FIG. 1 to FIG. 5 denote the same members. Thus, a detailed description of the same reference numerals will be omitted hereinafter.

As shown in FIG. 6, in a rechargeable battery 200 according to this exemplary embodiment, the side surface 151 of the insulating pack 150 next to the lead tab 40 may be open.

Accordingly, it may be possible for the electrode assembly 10 to be inserted into the insulating pack 150 more easily.

The insulating pack 150 may be evenly flat at the receiving portion 153 in the state that both sides 151 where the lead tabs 40 are located are open. Accordingly, the electrode assembly 10 may be positioned inside of the receiving portion 153 when the receiving portion 153 is in the evenly flat state. The electrode assembly 10 may then be received inside of the receiving portion 153 by rolling or folding the evenly flat receiving portion 153.

Figure 7:
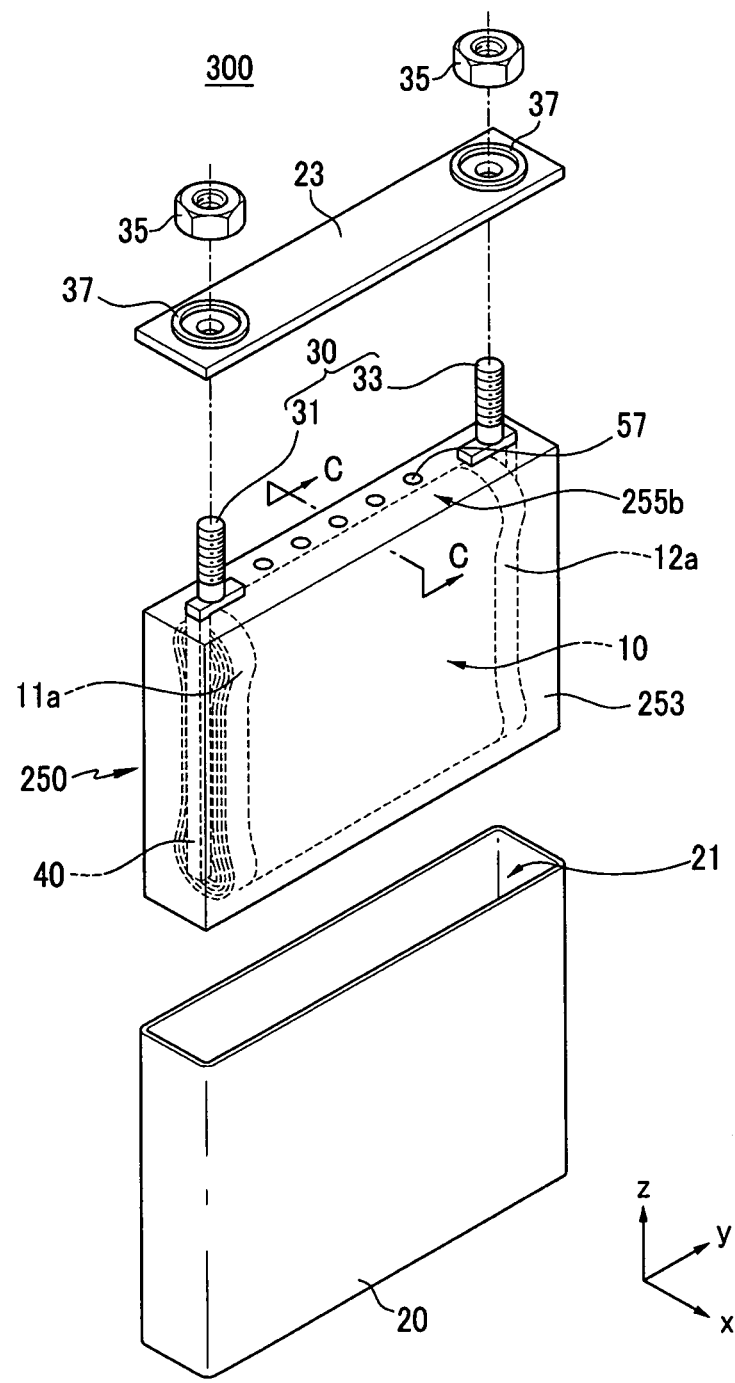
FIG. 7 illustrates an exploded perspective view of a rechargeable battery according to another exemplary embodiment.
Figure 8:
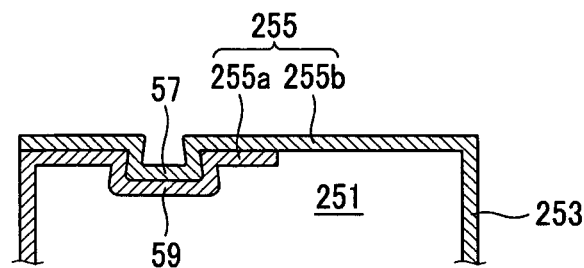
FIG. 8 illustrates a cross-sectional view taken along the line C-C of FIG. 7.

FIG. 7 illustrates an exploded perspective view of a rechargeable battery according to another exemplary embodiment, and FIG. 8 illustrates a cross-sectional view taken along the line C-C of FIG. 7. The same reference numerals as those of FIG. 1 to FIG. 6 denote the same members. Thus, a detailed description of the same reference numerals will be omitted hereinafter.

As shown in FIG. 7 and FIG. 8, a covering portion 255 forming an insulating pack 250 of a rechargeable battery 300 according to this exemplary embodiment includes a first cover 255a and a second cover 255b.

The first cover 255a may extend at one edge of the opening 251 thereby covering the portion of the opening 251. A plurality of grooves 59 may be disposed in the length direction of a receiving portion 253.

The second cover 255b may extend at the other edge of the opening 251 thereby overlapping the first cover 255a A plurality of indentation portions 57 may be disposed at position facing the grooves 59 to be insertion-coupled thereto.

In the state of sealing the receiving portion 253 by using the first cover 255a and the second cover 255b, the shape of the insulating pack 250 may be formed with the polygonal shape of a hexahedron. The insulating pack 250 according to this exemplary embodiment does not have a protrusion in the direction of the terminal 30, and thereby the application of the inner space of the rechargeable battery 300 may be maximized.

Figure 9:
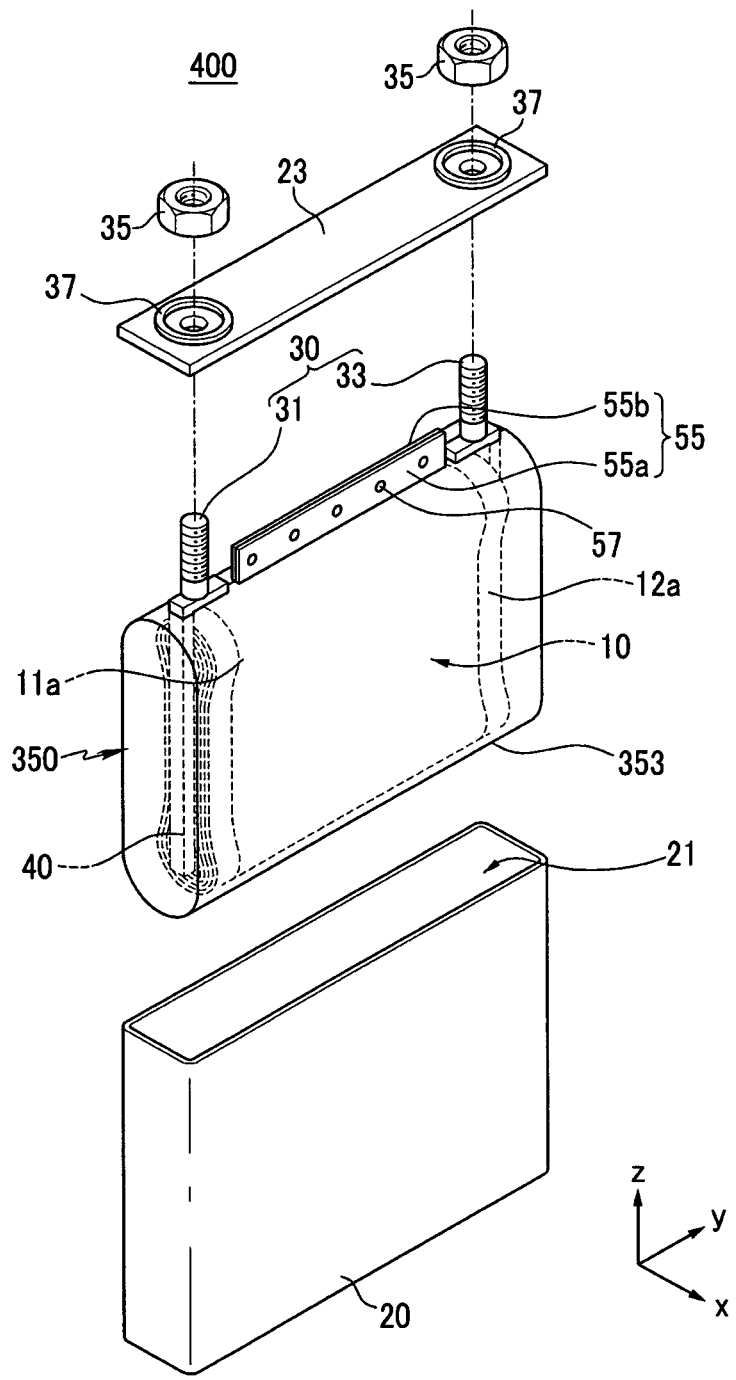
FIG. 9 illustrates an exploded perspective view of a rechargeable battery according to a fourth exemplary embodiment.

FIG. 9 illustrates an exploded perspective view of a rechargeable battery according to another exemplary embodiment. The same reference numerals as those of FIG. 1 to FIG. 8 denote the same members. Thus, a detailed description of the same reference numerals will be omitted hereinafter.

As shown in FIG. 9, an insulating pack 350 of a rechargeable battery 400 according to the exemplary embodiment may have a rounded pouch-like shape. That is, a receiving portion 353 according to this exemplary embodiment may have rounded edges of the pouch shape such that the space between the electrode assembly 10 and the receiving portion 353 may be minimized.

By way of summation and review, a square-shaped rechargeable battery may include an electrode assembly in which a positive electrode and a negative electrode are positioned with a separator interposed therebetween, a case having a space in which the electrode assembly is installed, and a cap plate hermetically sealing the case and having a terminal hole through which a terminal that is electrically connected with the electrode assembly protrudes to the outer surface of the case.

In such a rechargeable battery, it is desirable to insulate between the electrode assembly and the case. The embodiments disclosed herein circumvent any need for a process of providing an insulating film between the electrode assembly and the case, such a process being very complicated and possibly leading to a risk of the insulating film being torn. In this regard, if the insulating film is torn, an inner short may be generated such that serious problems such as an explosion of the rechargeable battery may occur.

Also, the embodiments disclosed herein help to avoid the possibility that, if the electrode assembly is shaken by an external impact or vibration, the electrode assembly may be damaged or torn such that an inner short may be generated.

The described embodiments provide a rechargeable battery in which an electrode assembly and a case are stably insulated therebetween, and in which the electrode assembly is effectively protected from an external impact.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope as set forth in the following claims.

What is claimed is:

1. A rechargeable battery, comprising:
    an electrode assembly that undergoes charging and discharging;
    a case containing the electrode assembly;
    a terminal electrically connected to the electrode assembly and protruding from an interior of the case to an exterior of the case;
    a lead tab electrically connecting the terminal and the electrode assembly; and
    an insulating pack that insulates the electrode assembly from the case, the electrode assembly being disposed in the insulating pack and the insulating pack being disposed in the case such that the insulating pack is between the electrode assembly and the case, the insulating pack including an indentation portion and a groove positioned to correspond to the indentation portion and to be insertion-coupled to the indentation portion, a receiving portion having an opening at one side, configured to receive the electrode assembly, and a covering portion covering the opening,
    wherein:
    the case includes a space that accommodates the insulating pack and the electrode assembly, the case having one open end,
    the case is coupled to a cap plate at the one open end of the case, the cap plate hermetically sealing the case, and
    the covering portion includes:
    a first cover that extends from one edge of the opening in a direction of the terminal and that includes a plurality of the indentation portions disposed in a lengthwise direction; and
    a second cover that extends from another edge of the opening at a position facing the first cover, and including a plurality of the grooves disposed at a position facing the indentation portions and insertion-coupled to the indentation portions.

2. The rechargeable battery as claimed in claim 1, wherein the receiving portion has a polygonal shape and wherein the opening opens in a direction of the terminal.

3. The rechargeable battery as claimed in claim 1, wherein the receiving portion has an opened side surface that exposes the lead tab and an end of the electrode assembly in the insulating pack.

4. The rechargeable battery as claimed in claim 1, wherein the insulating pack has a pouch shape.

5. A rechargeable battery, comprising:
    an electrode assembly that undergoes charging and discharging;
    a case containing the electrode assembly;

a terminal electrically connected to the electrode assembly and protruding from an interior of the case to an exterior of the case;

a lead tab electrically connecting the terminal and the electrode assembly; and an insulating pack that insulates the electrode assembly from the case, the electrode assembly being disposed in the insulating pack and the insulating pack being disposed in the case such that the insulating pack is between the electrode assembly and the case, the insulating pack including an indentation portion and a groove positioned to correspond to the indentation portion and to be insertion-coupled to the indentation portion, a receiving portion having an opening at one side, configured to receive the electrode assembly, and a covering portion covering the opening, wherein:

the case includes a space that accommodates the insulating pack and the electrode assembly, the case having one open end, the case is coupled to a cap plate at the one open end of the case, the cap plate hermetically sealing the case, and the covering portion includes:

a first cover that extends at one edge of the opening thereby covering a portion of the opening and having a plurality of the grooves formed in a lengthwise direction; and a second cover that extends at another edge of the opening thereby overlapping a portion of the first cover, and having a plurality of indentation portions at a position facing the grooves and insertion-coupled to the grooves.

6. The rechargeable battery of claim 5, wherein the insulating pack includes a through-hole through which the lead tab extends.

7. The rechargeable battery as claimed in claim 6, wherein the insulating pack includes a hard polyvinyl chloride material having a plasticizer content of less than 10%.

8. The rechargeable battery as claimed in claim 5, wherein the plurality of indentation portions and the plurality of grooves are monolithically formed with the same material as the insulating pack.

\* \* \* \* \*